(12) United States Patent
Hoetzeldt et al.

(10) Patent No.: US 8,714,483 B2
(45) Date of Patent: May 6, 2014

(54) DECOMPRESSION DEVICE AND DECOMPRESSION SYSTEM

(75) Inventors: Stephan Hoetzeldt, Bremen (DE);
Oliver Schindler, Bremen (DE);
Gerhard Penski, Wildeshausen (DE)

(73) Assignee: Airbus Operations GmbH, Hamburg (DE)

( * ) Notice: Subject to any disclaimer, the term of this patent is extended or adjusted under 35 U.S.C. 154(b) by 125 days.

(21) Appl. No.: 13/230,903

(22) Filed: Sep. 13, 2011

(65) Prior Publication Data

US 2012/0234973 A1    Sep. 20, 2012

Related U.S. Application Data

(60) Provisional application No. 61/382,072, filed on Sep. 13, 2010.

(30) Foreign Application Priority Data

Sep. 13, 2010  (DE) .......................... 10 2010 045 197

(51) Int. Cl.
*B64D 11/00* (2006.01)

(52) U.S. Cl.
USPC ........................................ 244/118.5

(58) Field of Classification Search
USPC .............. 244/118.5, 129.1, 129.4; 52/1
See application file for complete search history.

(56) References Cited

U.S. PATENT DOCUMENTS

| | | | |
|---|---|---|---|
| 4,899,960 A | | 2/1990 | Hararat-Tehrani et al. |
| 5,085,017 A | * | 2/1992 | Hararat-Tehrani ................. 52/1 |
| 5,606,829 A | * | 3/1997 | Hararat-Tehrani ................. 52/1 |
| 5,871,178 A | * | 2/1999 | Barnett et al. .............. 244/118.5 |
| 6,129,312 A | * | 10/2000 | Weber ......................... 244/118.5 |
| 6,435,455 B1 | * | 8/2002 | Holman et al. ............. 244/118.5 |
| 7,654,487 B2 | * | 2/2010 | Ghoreishi et al. ......... 244/118.5 |

FOREIGN PATENT DOCUMENTS

WO    2010/099952 A1    9/2010

* cited by examiner

*Primary Examiner* — Timothy D Collins
*Assistant Examiner* — Keith L Dixon
(74) *Attorney, Agent, or Firm* — Carter, DeLuca, Farrell & Schmidt, LLP

(57) ABSTRACT

A decompression device is provided having a frame element, in which at least one decompression opening is formed, and a cover is fastenable by means of a fastening device to the frame element in order in a first position to close the decompression opening formed in the frame element. The fastening device includes at least one holding clip and at least one receiving device that is complementary to the holding clip. The holding clip and the receiving device complementary to the holding clip are situated in engagement with one another when the cover is situated in its first position and are adapted to move out of engagement when a predetermined differential pressure acts upon the cover in order to enable the cover to move relative to the frame element into a second position, in which the cover releases the decompression opening formed in the frame element.

12 Claims, 4 Drawing Sheets

DECOMPRESSION DEVICE AND DECOMPRESSION SYSTEM

TECHNICAL FIELD

The invention relates to a decompression device provided for use in an air vehicle, in particular an aircraft, as well as to a decompression system equipped with such a decompression device.

BACKGROUND

Modern aircraft conventionally have a pressurized cabin, the internal pressure of which is maintained, while the aircraft is flying, at a raised pressure level compared to the ambient pressure, i.e. the reduced atmospheric pressure at high altitudes, by means of an air conditioning system that is supplied for example with air drawn off from the engine(s). In order to regulate the cabin pressure, cabin air may be released into the atmosphere through outlet valves. In general, the pressure in the interior of the cabin of an aircraft while the aircraft is flying, i.e. when the aircraft is situated at cruising altitude, usually corresponds approximately to atmospheric pressure at an altitude of 8000 ft. (ca. 2400 m).

The pressurized cabin is customarily subdivided by dividing walls and/or intermediate floors into mutually separate areas, such as for example cockpit, passenger cabin, crew rest compartment, top deck, main deck or cargo compartments. In the event of a pressure drop (decompression) in one aircraft area, for example as a result of damage to the pressurized cabin or failure of an outlet valve, a pressure difference arises between the aircraft area affected by the pressure drop and the areas of the aircraft that are adjacent to this aircraft area. This pressure difference may lead to damage of the primary structure of the aircraft and/or of the dividing walls and intermediate floors that separate the decompressed aircraft area from the areas of the aircraft that are adjacent to this aircraft area. In order to avert the potentially serious consequences of such damage, it is therefore necessary in the event of decompression to ensure a rapid pressure compensation between the aircraft area affected by the pressure drop and the areas of the aircraft that are adjacent to this aircraft area.

For this reason, in dividing walls and/or intermediate floors decompression devices are provided, which for example, as described in DE 37 15 328 C1, comprise a decompression frame as well as a decompression panel accommodated in the decompression frame. The decompression panel is mounted in the decompression frame by means of leaf springs that have predetermined breaking points. If a predetermined differential pressure acts upon the decompression panel, the leaf springs break in the region of the predetermined breaking points and the decompression panel releases a pressure compensation opening in the dividing wall and/or intermediate floor that is delimited by the decompression frame.

Furthermore, from the non-prior publication DE 10 2009 012 015 a decompression device is known, which is integrated into an aircraft cabin trim panel and has a flap that is attached by a hinge- or bearing element to a decompression frame provided with a grating. If in a decompression situation a predetermined pressure difference acts upon the flap of the decompression device, the flap releases a pressure compensation opening between an area of the aircraft cabin affected by the decompression and an area delimited by the cabin trim panel and an aircraft skin.

SUMMARY

The invention is directed to the object of providing a lightweight decompression device of a simple construction, which already in the presence of a slight pressure difference between an aircraft area affected by a decompression and an area of the aircraft that is adjacent to this aircraft area ensures a reliable pressure compensation between the aircraft area affected by the decompression and the area of the aircraft that is adjacent to this aircraft area. The invention is further geared to the object of indicating a decompression system equipped with such a decompression device.

This object is achieved by a decompression device having the features of claim 1 and by a decompression system having the features of claim 11.

A decompression device according to the invention comprises a frame element, in which at least one decompression opening is formed. A cover is further provided, which may be fastened by means of a fastening device to the frame element in order in a first position to close the decompression opening formed in the decompression frame. There may be only one decompression opening formed in the frame element. It is however alternatively conceivable to provide the frame element with a plurality of decompression openings. Given such a configuration of the decompression device according to the invention, a separate cover may be provided for each decompression opening. The decompression device may however also be provided with one cover that in its first position closes a plurality of decompression openings formed in the frame element. Preferably the cover in its first position is adapted to close the decompression opening(s) formed in the frame element in such a way that, in the event of fire, smoke is substantially prevented from passing through the decompression opening(s) formed in the frame element. Furthermore, the cover in its first position should comprise an adequate seal to prevent dripping water from passing through the decompression opening(s) formed in the frame element.

The fastening device for fastening the cover to the frame element comprises at least one holding clip as well as at least one receiving device that is complementary to the holding clip. When the cover is situated in its first position, the holding clip and the receiving device complementary to the holding clip are in engagement with one another, i.e. the holding clip is for example accommodated in the receiving device complementary to the holding clip. The fastening device of the decompression device according to the invention may comprise merely one holding clip and one receiving device complementary to the holding clip. However, a more stable fastening of the cover to the frame element is possible if the fastening device comprises a plurality of holding clips and a plurality of receiving devices complementary to the holding clips. The number of holding clips may correspond to the number of receiving devices. If desired, it is however also possible to provide more holding clips than receiving devices or more receiving devices than holding clips, for example if the cover is to be provided for fastening to various frame elements or if the frame element is to be suitable for interacting with covers of various configurations. A plurality of holding clips and/or a plurality of receiving devices are preferably disposed so as to be distributed along a periphery of the cover and/or of the frame element.

The holding clip and the receiving device may in each case be attached to and/or formed on both the cover and the frame element. If the holding clip is to be associated with the cover, the receiving device complementary to the holding clip is preferably associated with the fastening device. Conversely, a receiving device formed on and/or attached to the cover is preferably situated opposite a holding clip associated with the frame element. A configuration of a fastening device comprising a plurality of holding clips and a plurality of receiving devices is moreover conceivable, in which one or more holding clips are to be associated with the cover and one or more holding clips are to be associated with the frame element. The holding clip(s) formed on the cover is/are then provided in each case for interacting with a corresponding receiving device associated with the frame element, while the holding clip(s) formed on the frame element is/are provided for interacting with a corresponding receiving device associated with the cover.

The holding clip and the receiving device complementary to the holding clip are adapted to move out of engagement if a predetermined differential pressure acts upon the cover. This enables the cover to move relative to the frame element into a second position, in which the cover releases the decompression opening formed in the frame element. The predetermined differential pressure, at which the holding clip and the receiving device complementary to the holding clip move out of engagement, depends upon the dimensioning of the holding clip and/or the receiving device and upon the properties, in particular the stiffness and the elasticity of the material, from which the holding clip and/or the receiving device are manufactured. Thus, by virtue of suitable dimensioning of the holding clip and/or the receiving device and a suitable choice of material for these components it is possible to adjust in a desired manner the differential pressure, at which the holding clip separates from the receiving device and hence enables the cover to move relative to the frame element into its second position.

During its movement from its first position into its second position the cover may be moved in such a way that in its second position it is no longer connected to the frame element and/or is no longer disposed in the region of the decompression opening formed in the frame element. Alternatively, however, the cover in its second position may still be connected to the frame element and disposed in the region of the decompression opening formed in the frame element. All that matters is that as a result of the movement of the cover from its first position into its second position a pressure compensation is possible through the decompression opening formed in the frame element. This may be realized for example already by a slight pivoting of the cover relative to the frame element or a slight folding of the cover away from the frame element. Here, therefore, by "releasing the decompression opening formed in the frame element" is meant an arrangement of the cover relative to the frame element whereby the arrangement does not impede a pressure compensation through the decompression opening formed in the frame element.

The decompression device according to the invention may be configured in such a way that it is only able to guarantee a pressure compensation in one direction (blow-in situation). For many applications in an aircraft this functionality is however sufficient. A decompression device designed exclusively for the blow-in situation may be used in an aircraft wherever, in the event of an abrupt pressure drop in a first aircraft area, a pressure compensation with a second aircraft area adjacent to the first aircraft area has to be effected, an abrupt pressure drop in the second aircraft area is however ruled out. This is the situation, for example, if the first aircraft area is part of a pressurized cabin of the aircraft, while the second aircraft area is an unpressurized area of the aircraft.

The structural configuration of the fastening device of the decompression device according to the invention makes it possible to set very low triggering differential pressures. For example, the fastening device may be designed in such a way that the holding clip and the receiving device already move out of engagement upon a differential pressure acting upon the cover that is below 10 hPa and hence enable a movement of the cover into the second position thereof and consequently a release of the decompression opening formed in the frame element. It is thereby ensured that an aircraft component equipped with the decompression device according to the invention, for example a dividing wall separating adjacent aircraft areas from one another, an intermediate floor or a trim element, has to tolerate only very low loads caused by a differential pressure acting upon the component. The component may therefore be of a correspondingly less load-resistant and hence more lightweight design.

The decompression device itself is moreover notable for its structurally simple design and low weight. An aircraft component equipped with the decompression device according to the invention is consequently only insignificantly heavier than a corresponding component that is not equipped with a decompression device. Integration of the decompression device according to the invention into an aircraft component in the form of an acoustical panel is possible without difficulty. Finally, the decompression device according to the invention is notable for its high vibration resistance and low manufacturing- and assembly costs. There is no need to redesign the structure of components that are to be provided with the decompression device according to the invention or of existing test devices for function testing of the decompression device.

The holding clip of the fastening device may be configured as a separate component and fastened to the frame element or the cover. In a particularly simple configuration of the fastening device, however, the holding clip is formed integrally with the cover. For example, the holding clip may be formed integrally with a cover that is made of a glass-fibre-reinforced plastics material and is for example 0.1 to 0.5 mm, preferably 0.3 mm thick. The holding clip then has an elasticity that results in the holding clip separating from the receiving device if a differential pressure of ca. 10 hPa acts upon the cover.

The holding clip is preferably delimited by two cuts that are formed in the cover and extend from a peripheral edge of the cover towards an inner region of the cover. The cuts formed in the cover may extend substantially at right angles to the peripheral edge of the cover from the peripheral edge of the cover towards the inner region of the cover. However the cuts may alternatively extend at any desired angle relative to the peripheral edge of the cover. Straight cuts guarantee particularly easy manufacture of the holding clip. However, if desired or required, the cuts may alternatively have a curved course or a course of any other desired shape.

The receiving device complementary to the holding clip is preferably fastened to, or formed on, the frame element. In principle, it is conceivable for the receiving device to be fashioned as a separate component and fastened to the frame element. For example, the receiving device may be configured in the form of a receiving pocket formed in the frame element. A particularly simple and lightweight design of the fastening device is possible however if the receiving device is formed so as to be integrated with the frame element.

For example, the receiving device may comprise a receiving opening for example of a slot-shaped configuration, which penetrates the frame element. This receiving opening is preferably adapted to receive the holding clip when the cover is situated in its first position. In other words, the holding clip may be inserted into the slot-shaped receiving opening. The cover then rests against a first surface of the frame element, while the holding clip rests against a second, opposite surface of the frame element to the first surface of the frame element. Given such a configuration of the fastening device, the holding clip slides out of the receiving opening of the receiving device, i.e. the holding clip and the receiving device move out of engagement if a pressure acting upon the second surface of the frame element, and hence upon the surface of the cover facing the frame element, is higher by a predetermined amount of for example 10 hPa than a pressure acting upon the first surface of the frame element and/or upon the surface of the cover remote from the frame element.

In the region of the decompression opening formed in the frame element a grating element may be provided, which at least partially covers the decompression opening. The grating element may be configured as a separate component and for example be fastened to the frame element. Preferably, however, the grating element is formed integrally with the frame element. By means of the grating element components and system that are disposed, once the decompression device has been fitted in an aircraft, behind the decompression opening formed in the frame element may be protected. The grating element moreover protects the cover, when it is situated in its first position, against mechanical loads. The grating element, like the frame element, is preferably made of metal, in particular of aluminium or an aluminium alloy, in order to ensure an adequate stability under load of these components.

If a predetermined differential pressure acts upon the cover of the decompression device according to the invention and the cover is moved from its first position into its second position, the cover may, as already mentioned, be completely separated from the frame element. A preferred embodiment of the decompression device according to the invention however comprises a retaining device, which is adapted to retain the cover in its position relative to the frame element even when the cover is situated in its second position, in which the cover releases the decompression opening formed in the frame element. In other words, the retaining device ensures that the cover, as it moves from its first position into its second position, does not separate in an uncontrolled manner from the frame element. The retaining device may connect the cover movably to the frame element, a further component of the decompression device or an aircraft component that is to be equipped with the decompression device according to the invention. In a simply configured embodiment of the decompression device, however, the retaining device retains the cover movably on the frame element. For example, the retaining device may comprise a rivet or a plurality of rivets or some other suitable fastening means that is capable of preventing an uncontrolled separation of the cover from the frame element but at the same time does not impede the release of the decompression opening if a predetermined differential pressure acts upon the cover.

The decompression device according to the invention preferably further comprises a holding frame, which extends along at least a portion of the peripheral edge of the cover and/or the frame element. By means of the holding frame, which surrounds the cover and/or the frame element along at least a portion of the peripheral edge of the cover and/or the frame element, the decompression device may be fastened for example to a component for example of a panel-shaped configuration that is to be equipped with the decompression device. The holding frame, like the frame element, is preferably made of metal. For example, aluminium or an aluminium alloy may be used to manufacture the holding frame.

The holding frame preferably comprises a base element, which may extend in a frame-shaped manner along at least a portion of the peripheral edge of the cover and/or the frame element. The base element is preferably of a plate-shaped configuration. The holding frame preferably further comprises a projection element, which extends for example at an angle of 10 to 170° relative to the base element along an outer peripheral edge of the base element. The projection element extends preferably at an angle of 30 to 150°, particularly preferably at an angle of 60 to 120° and in a particularly preferred manner at an angle of ca. 90° relative to the base element. The projection element of the holding frame is used to divert any water streams around the frame element and the cover in order to prevent water from passing through the decompression opening formed in the frame element.

The projection element is preferably provided with at least one run-off opening. Preferably a plurality of run-off openings are provided in the projection element. In the case of a holding frame of a rectangular configuration, the projection element may be provided with run-off openings for example in the region of two corners of the holding frame that, once the decompression device has been fitted in an aircraft, form the bottom corners of the holding frame. Given such a configuration of the holding frame, water that has accumulated in the holding frame may easily be removed from the holding frame, driven by gravitational force.

A decompression system according to the invention comprises a component, in which an opening is formed. The component is preferably an aircraft component, in particular an aircraft component that is provided for insertion in a dividing wall or as to a dividing wall between two mutually adjacent aircraft areas, in an intermediate floor or as an intermediate floor of the aircraft or in the region of the internal trim of the aircraft. In the region of the opening formed in the component a previously described decompression device is connected to the component.

The decompression device may be fastened to the component by means of at least one mounting device that penetrates the base element of the holding frame. As a mounting device it is possible to use for example a screw or a rivet. In a particularly preferred embodiment of the decompression system, the mounting device also penetrates the frame element, with the result that a single mounting device is sufficient both to fasten the holding frame to the component and to effect a connection of the frame element to the holding frame and the component. It is self-evident that, if need be, a plurality of mounting devices may also be provided.

The decompression device is preferably coupled by a coupling element made of an electrically conductive elastomer material to the component and to the frame element optionally comprising a grating element, wherein the frame element optionally comprising a grating element is preferably made of a metal. The coupling element may be disposed for example between the frame element and the component or the base element of the holding frame and the component and is used to establish an electrically conductive contact between the decompression device and the component. As a result systems, in particular electrical or electronic components, which, once the decompression system has been fitted in an aircraft, are disposed behind the component, may be shielded from electromagnetic interference. The coupling element may be made for example of an electrically conductive sealing material. For example, use may be made of a coupling element that is manufactured from expanded polytetrafluoroethylene filled with metal particles, in particular nickel particles. If desired, in the coupling element an opening may be formed, which is penetrated by the mounting device for fastening the decompression device to the component.

The component and/or the components of the decompression device, i.e. the holding frame, the frame element and/or the cover may be provided with a lacquer coating that guarantees an NVG (night vision goggles) compatibility of the decompression system.

BRIEF DESCRIPTION OF THE DRAWINGS

There now follows a detailed description of a preferred embodiment of the invention with reference to the accompanying diagrammatic drawings, of which

DETAILED DESCRIPTION

Figure 1:
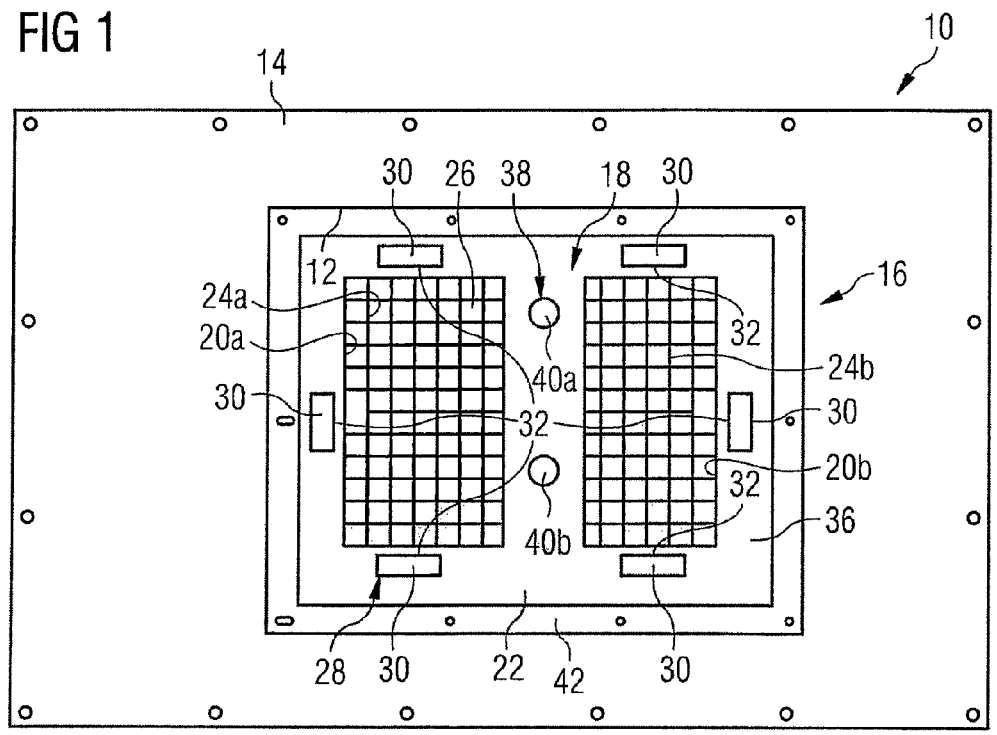
FIG. 1 shows a front view of a decompression system.

The figures show a decompression system 10, which comprises a component 14 provided with an opening 12. The component 14 is a panel-shaped aircraft interior trim component, which is provided for being integrated into a dividing wall that separates two mutually adjacent areas of an aircraft from one another in a cargo compartment area of the aircraft. In the embodiment shown in the figures, the component 14 takes the form of an acoustical panel of a sandwich construction and comprises a core as well as a surface layer mounted onto the core. For example, the component 14 may have a mass per unit area of ca. 1500 g/m². The component 14 may however alternatively have a monolithic structure and/or be provided for installation at some other location in an aircraft.

Fastened to the component 14 in the region of the opening 12 formed in the component 14 is a decompression device 16. The decompression device 16 comprises a frame element 18 that has a rectangular basic shape adapted to the likewise rectangular basic shape of the opening 12 formed in the component 14. Two decompression openings 20a, 20b are formed in the frame element 18 and separated from one another by a web 22. Provided in the region of each of the decompression openings 20a, 20b formed in the frame element 18 is a grating element 24a, 24b. Each grating element 24a, 24b extends over the entire surface area of a decompression opening 20, 20b. The grating elements 24a, 24b are formed integrally with the frame element 18 and comprise a milled network structure having a mesh size of from 10×10 mm to 40×40 mm. The size of the frame element 18 may be for example 500×500 mm. If the frame element 18 is made of aluminium or an aluminium alloy and is ca. 1 mm thick, the weight of the frame element 18 is ca. 300 g.

The decompression device 16 further comprises a cover 26. In the embodiment of a decompression system 10 shown in the figures, the cover 26 is made from a glass-fibre-reinforced plastics material and is ca. 0.3 mm thick. If the dimensions of the cover 26 are, as shown, adapted to the dimensions of the frame element 18 and are likewise ca. 500×500 mm, the weight of the cover 26 is ca. 200 g.

The cover 26 is fastened by means of a fastening device 28 to the frame element 18 in a first position, which is represented in the figures and in which the cover 26 closes the decompression openings 20a, 20b formed in the frame element 18. In its first position the cover 26 renders the decompression system 10 99% smoke-proof, i.e. in the event of fire the cover 26 prevents smoke from passing through the decompression openings 20a, 20b formed in the frame element 18. The fastening device 28 comprises six holding clips 30, which are formed in each case integrally with the cover 26 and arranged distributed around the periphery of the cover 2, which like the frame element 18 is of a rectangular configuration. Each holding clip 30 is delimited by two cuts that are formed in the cover and extend from a peripheral edge of the cover 26 at an angle of ca. 90° from the peripheral edge of the cover 26 towards an inner region of the cover. Each holding clip 30 is therefore "foldable" or pivotable relative to the rest of the cover 26.

Figure 2:
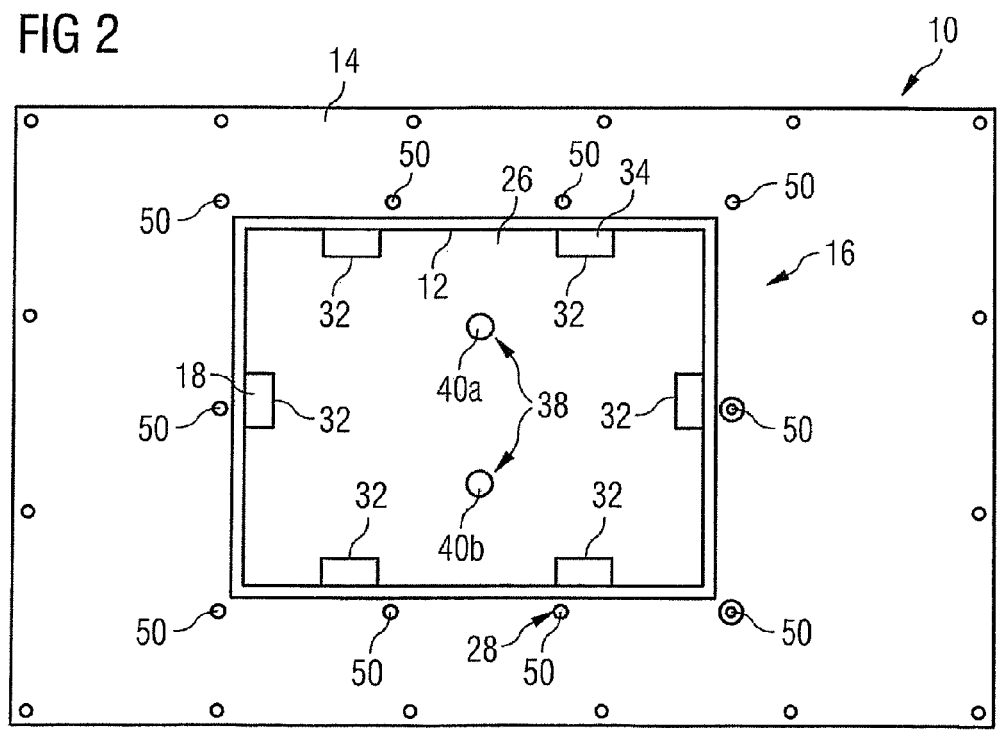
FIG. 2 shows a rear view of the decompression system according to FIG. 1.

The fastening device 28 further comprises six receiving devices 32. Each receiving device 32 is provided to be situated in engagement with a holding clip 30 when the cover 26 is situated in its first position represented in the figures. In the embodiment of a decompression system 10 shown in the figures, each receiving device 32 is formed by a slot-shaped opening, which is formed in the frame element 18 and the size of which is so selected that a holding clip 30 may be inserted through the slot-shaped opening. When the cover 26 is situated in its first position represented in the figures, the cover 26 therefore rests on a first surface 34 of the frame element 18 (see in particular FIGS. 2 and 4). The holding clips 30, on the other hand, rest against a second, opposite surface 36 of the frame element 18 to the first surface 34 of the frame element 18 (see in particular FIGS. 1 and 3).

The cover 26 is moreover retained on the frame element 18 by means of a retaining device 38. The retaining device 38 comprises two rivets 40a, 40b, which penetrate the web 22 of the frame element 18 and the cover 26 and hence effect a fastening of the cover 26 to the frame element 18.

Figure 7:
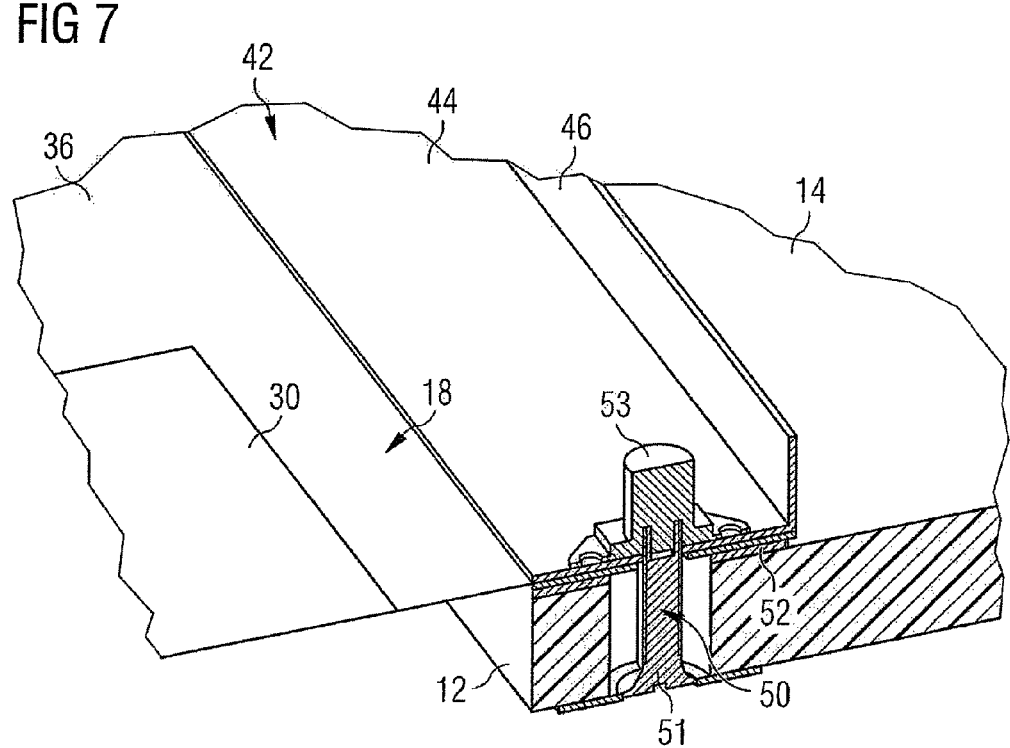
FIG. 7 shows a three-dimensional sectional view of a mounting device of the decompression system.

Finally, the decompression device 16 comprises a holding frame 42, which extends along the peripheral edge of the frame element 18 and the cover 26. The holding frame 42, like the frame element 18, is made of aluminium or an aluminium alloy and comprises a plate-shaped base element 44 that extends substantially parallel to a surface of the component 14 (see in particular FIGS. 7 and 8). The holding frame 42 further comprises a projection element 46. The projection element 46 extends at an angle of ca. 90° relative to the base element 44 along an outer peripheral edge of the base element 44. The base element 44 and the projection element 46 are formed integrally with one another.

Figure 3:
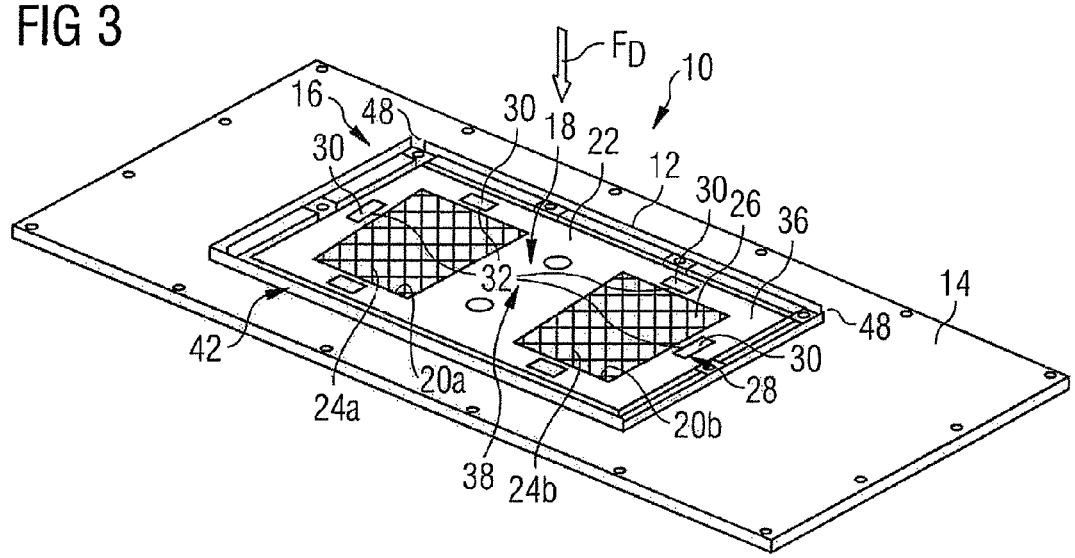
FIG. 3 shows a three-dimensional view of a front side of the decompression system according to FIG. 1.
Figure 4:
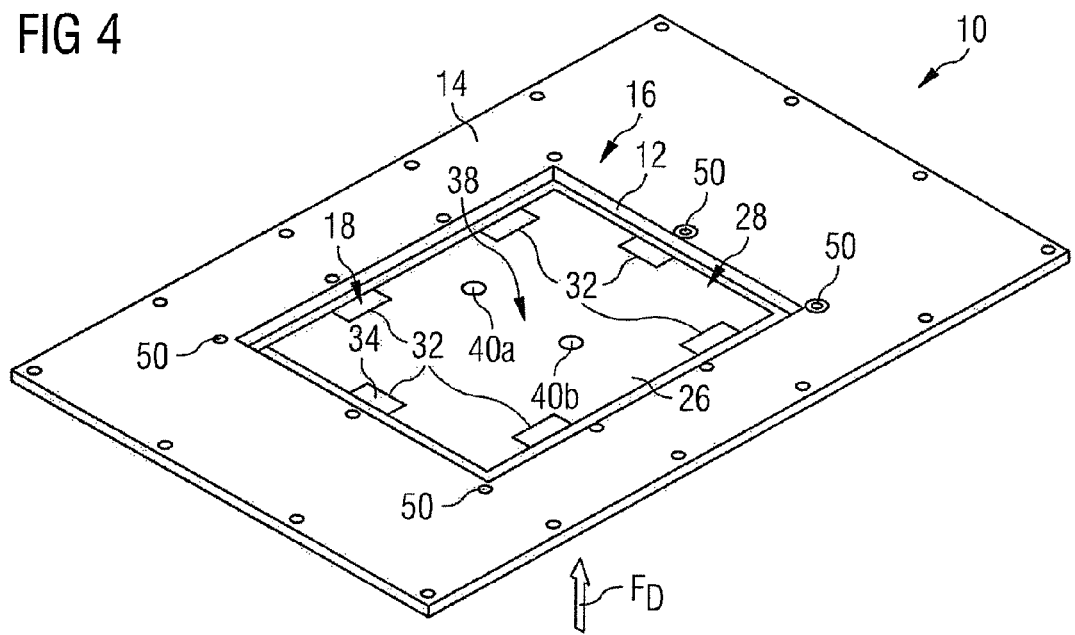
FIG. 4 shows a three-dimensional view of a rear side of the decompression system according to FIG. 1.
Figure 5:
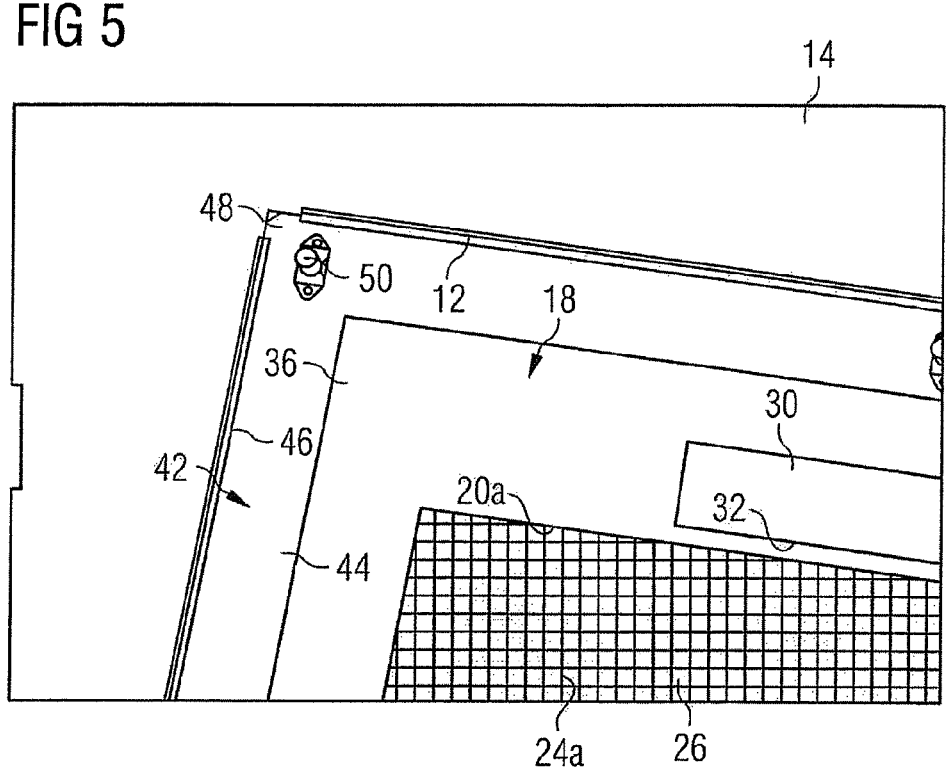
FIG. 5 shows a detail representation of the view of the decompression system according to FIG. 3.
Figure 6:
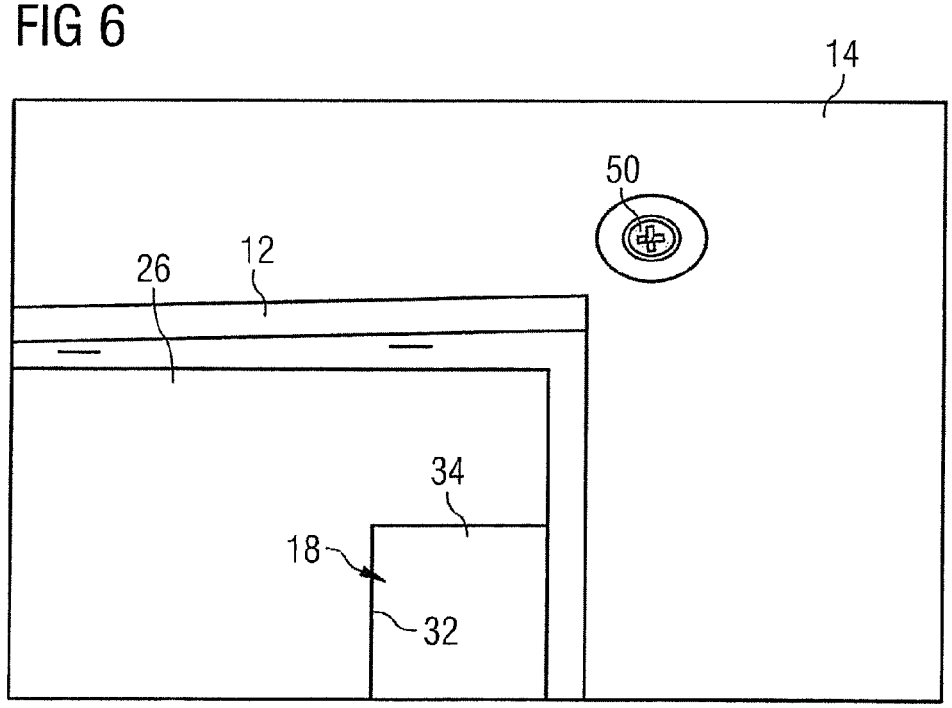
FIG. 6 shows a detail representation of the view of the decompression system according to FIG. 4.

The projection element 46 is used to prevent water, which is running down a surface of the component 14, from penetrating into the region of the decompression system 10 that is defined by the opening 12 formed in the component 14. In order to guarantee a proper removal of water accumulations that arise in the region of the holding frame 42, the projection element 46, as is shown in particular in FIGS. 3 and 5, is provided with run-off openings 48 in the region of two corners of the holding frame 42. Once the decompression system 10 has been fitted in an aircraft, the corners of the holding frame 42, at which the projection element 46 has been provided with run-off openings 48, form the bottom corners of the holding frame 42. Water that has accumulated in the holding frame 42 may run off from the holding frame 42, driven by gravitational force.

The decompression device 16 is fastened to the component 14 by means of eight mounting devices 50 configured in the form of screw/nut arrangements. As is evident from FIGS. 7 and 8, a screw 51 of each mounting device 50 penetrates mounting openings formed in the component 14, the frame element 18 and the holding frame 42 and is screw-fastened in a corresponding nut 53 of the mounting device 50. Thus, by means of the mounting devices 50 both the holding frame 42 and the frame element 18 may be fastened to the component 14.

Figure 8:
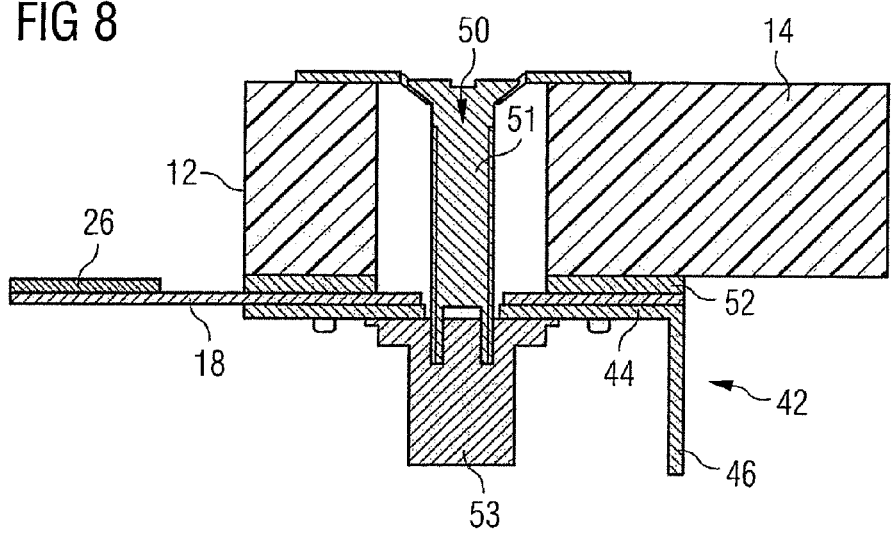
FIG. 8 shows a sectional view of the mounting device represented in FIG. 7.

As may further be seen from FIG. 8, the decompression system 10 further comprises a coupling element 52, which is disposed between the frame element 18 and the component 18 and effects an electrically conductive coupling of the decompression device 16 to the component 14. The coupling element 52 is made of an electrically conductive elastomer material. For example, expanded polytetrafluoroethylene filled with nickel particles or other metal particles may be used to manufacture the coupling element 52. The coupling element 52, like the component 14, the frame element 18 and the holding frame 42, is provided with a mounting opening and may therefore, like the component 14, the frame element 18 and the holding frame 42, be penetrated by the mounting devices 50. The coupling element 52, together with the metal frame element 18 formed integrally with the grating elements 24a, 24b, effects a shielding of systems disposed behind the decompression system 10 from electromagnetic interference.

Finally, the component 14, the frame element 18 and the holding frame 42 are provided with a suitable lacquer coating that ensures the NVG compatibility of the decompression system 10.

As a whole, the decompression system 10 in the embodiment shown in the figures comprises a component 14, the dimensions (width×length×thickness) of which are 400 mm×650 mm×15 mm. The decompression system 10 moreover provides a decompression area, i.e. an area that is available for pressure compensation in the event of decompression, of 0.16 m². Assuming a total weight of the retaining device 38 and the mounting devices 50 of ca. 100 g, the decompression device 16 that provides a decompression area of ca. 0.16 m² has a total weight of ca. 800 g. Thus, compared to a component that is not equipped with a decompression device 16, the decompression system 10 weighs only slightly more.

During normal operation of the aircraft, i.e. when substantially the same pressure prevails in aircraft areas that are separated from one another by the component 14, the decompression system 10 is situated in the operating state represented in the figures, i.e. the cover 26 is situated in its first position, in which it closes the decompression openings 20a, 20b formed in the frame element 18. The cover 26 is held in its first position so long as the holding clips 30 are situated in engagement is with the receiving devices 32, i.e. so long as the holding clips 30 are inserted into the slot-shaped receiving openings in the frame element 18 that form the receiving devices 32.

If a pressure acting upon the second surface 36 of the frame element 18 and consequently upon the surface of the cover 26 facing the frame element 18, i.e. the surface of the cover 26 resting on the first surface 34 of the frame element 18, is higher by a predetermined amount than the pressure acting upon the surface of the cover 26 remote from the frame element 18, then the pressing force $F_D$ acting upon the surface of the cover 26 facing the frame element 18 (see FIGS. 3 and 4) has the effect that the holding clips 30 separate from their position, in which they are inserted in the receiving devices 32. As a result, the cover 26 is "folded" relative to the frame element 18 in the direction of the pressing force $F_D$ acting upon the cover 26. In other words, as soon as the holding clips 30 and their associated receiving devices 32 move out of engagement and the holding clips 30 are no longer inserted in the receiving devices 32, the cover 26 moves into a second position, in which it is "folded" relative to the frame element 18. When the cover 26 is situated in its second position, it releases the decompression openings 20a, 20b formed in the frame element 18 to such an extent that a pressure compensation between the aircraft areas separated from one another by the component 14 is possible through the decompression openings 20a, 20b.

The pressure difference that is needed to move the holding clips 30 out of engagement with the receiving devices 32 associated therewith may be influenced by corresponding dimensioning of the cover 26 and hence of the holding clips 30, by a suitable choice of material for the cover 26 and by the configuration of the receiving devices 32. In the illustrated embodiment, in which the cover 26 is made of glass-fibre-reinforced plastics material and is approximately 0.3 mm thick, the differential pressure that has to act upon the cover 26 in order to separate the holding clips 30 from their position of insertion in the receiving devices 32 is ca. 10 hPa. Thus, already in the event of slight differential pressures acting upon the component 14 the decompression system 10 enables a pressure compensation between the aircraft areas that are separated from one another by the component 14. Loads acting as a result of a differential pressure upon the component 14 may therefore be minimized.

Even when the cover 26, as described above, as a result of a differential pressure acting upon the cover 26 is moved from its first position into its second position, the cover 26 is retained on the frame element 18 by means of the retaining device 38, i.e. the retaining device 38 prevents the cover 26 from separating in an uncontrolled manner from the frame element 18. As the retaining device 38 fastens the cover 26 to the frame element 18 in the region of the web 22, a differential pressure acting upon the cover 26 leads to a "folding movement" of the portions of the cover 26 disposed on either side of the web 22 relative to the frame element 18 in the direction of the pressing force $F_D$ acting upon the cover 26, wherein an imaginary line extending between the rivets 40a, 40b of the retaining device 38 forms a kind of "folding axis" for the "folding movement" of the portions of the cover 26 positioned on either side of the web 22.

The invention claimed is:

1. Decompression device comprising:
   a frame element, in which at least one decompression opening is formed, and
   a cover that is fastenable by means of a fastening device to the frame element in order in a first position to close the decompression opening formed in the frame element,
   wherein the fastening device comprises at least one holding clip formed on the cover and at least one receiving device that is complementary to the holding clip, the receiving device comprising a receiving opening that penetrates the frame element and is adapted to receive the holding clip when the cover is situated in its first position, wherein the holding clip and the receiving device complementary to the holding clip are situated in engagement with one another, wherein the cover rests on a first surface of the frame element and the holding clip penetrates the receiving opening and rests against a second surface of the frame element opposing the first surface of the frame element when the cover is situated in its first position, and wherein the holding clip and the receiving device complementary to the holding clip are adapted to move out of engagement if a predetermined differential pressure acts upon the cover in order to enable the cover to move relative to the frame element into a second position, in which the cover releases the decompression opening formed in the frame element.

2. Decompression device according to claim 1, wherein the holding clip is formed integrally with the cover.

3. Decompression device according to claim 2, wherein the holding clip is delimited by two cuts, which are formed in the cover and extend from a peripheral edge of the cover towards an inner region of the cover.

4. Decompression device according to claim 1, wherein in the region of the decompression opening formed in the frame element a grating element that at least partially covers the decompression opening is provided.

5. Decompression device according to claim 1, further comprising a retaining device that is adapted to retain the cover in its position relative to the frame element when the cover is situated in its second position, in which the cover releases the decompression opening formed in the frame element.

6. Decompression device according to claim 1, further comprising a holding frame that extends along at least a portion of the peripheral edge of at least one of the cover and the frame element.

7. Decompression device according to claim 6, wherein the holding frame comprises a base element as well as a projection element, which is disposed at an angle of between 10° and 170° relative to the base element and extends along an outer peripheral edge of the base element.

8. Decompression device according to claim 7, wherein the projection element is provided with at least one run-off opening.

9. Decompression system comprising:
a component, in which an opening is formed, and
a decompression device according to claim 1, which in the region of the opening formed in the component is connected to the component.

10. Decompression system according to claim 9, wherein the decompression device is fastened to the component by means of at least one mounting device that penetrates the base element of the holding frame and the frame element.

11. Decompression system according to claim 9, wherein the decompression device is coupled by a coupling element made of an electrically conductive elastomer material to the component and to the frame element optionally comprising a grating element, wherein the frame element optionally comprising a grating element is made of a metal.

12. Decompression system according to claim 9, wherein at least one of the component and the components of the decompression device is/are provided with a lacquer coating that guarantees an NVG compatibility of the decompression system.

* * * * *